United States Patent
DeLuca et al.

(10) Patent No.: US 10,977,323 B2
(45) Date of Patent: Apr. 13, 2021

(54) DETERMINING DOMAIN EXPERTISE AND PROVIDING TAILORED INTERNET SEARCH RESULTS

(71) Applicant: INTERNATIONAL BUSINESS MACHINES CORPORATION, Armonk, NY (US)

(72) Inventors: Lisa Seacat DeLuca, Baltimore, MD (US); Stefan A. Gert van der stockt, Johannesburg (ZA)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 15/408,966

(22) Filed: Jan. 18, 2017

(65) Prior Publication Data
US 2018/0203933 A1    Jul. 19, 2018

(51) Int. Cl.
*G06F 16/9535*    (2019.01)

(52) U.S. Cl.
CPC ................ *G06F 16/9535* (2019.01)

(58) Field of Classification Search
CPC .................................................. G06F 16/9535
See application file for complete search history.

(56) References Cited

U.S. PATENT DOCUMENTS

| | | | |
|---|---|---|---|
| 8,402,024 B2 | 3/2013 | White et al. | |
| 8,903,810 B2 | 12/2014 | Ismalon | |
| 9,002,837 B2 | 4/2015 | Brandstetter | |
| 2009/0106233 A1* | 4/2009 | Veenstra | G06F 16/954 |
| 2012/0117061 A1* | 5/2012 | White | G06F 16/24578 707/734 |
| 2013/0060763 A1* | 3/2013 | Chica | G06F 16/335 707/723 |
| 2013/0173610 A1* | 7/2013 | Hu | G06F 16/951 707/728 |
| 2016/0092557 A1* | 3/2016 | Stojanovic | G06Q 30/02 707/723 |
| 2016/0358240 A1* | 12/2016 | Redfern | G06F 16/248 |
| 2017/0132227 A1* | 5/2017 | Bostick | G06F 16/9535 |
| 2018/0150749 A1* | 5/2018 | Wu | G06F 17/2765 |

OTHER PUBLICATIONS

Anonymous; System and Method for Content based Search; IP.com; IPCOM000195008D; Apr. 19, 2010; 5 pages.
IBM; Intelligent Rendering of Search; IP.com; IPCOM000182446D; Apr. 30, 2009; 4 pages.

* cited by examiner

*Primary Examiner* — Matthew J Ellis
(74) *Attorney, Agent, or Firm* — Schmeiser, Olsen & Watts; Stephanie Carusillo

(57) ABSTRACT

An apparatus, method and associated system is described for the production of search results that are determined to be of interest to the user based on both the search phrase and the level of expertise of the user. Literature is analyzed from a plurality of different domains, and a database, map and/or lexicon is built that categorizes the literature by different levels of expertise. Each item of literature is assigned a particular level of expertise. At least one keyword in a user's search query is analyzed and compared with at least part of the database, and a user's level of expertise is based, at least in part, on the comparison. A set of search results is generated for the search query that is weighted, at least in part, based on a correlation between the user's level of expertise and the particular level of expertise assigned to each item of literature.

18 Claims, 5 Drawing Sheets

DETERMINING DOMAIN EXPERTISE AND PROVIDING TAILORED INTERNET SEARCH RESULTS

TECHNICAL FIELD

The present invention relates generally to a method for providing tailored search results and, more particularly, to a method for providing weighted search results based on a user's perceived level of expertise for a particular domain.

BACKGROUND

Users of the World Wide Web use many different techniques and mechanisms to find information they desire. Users may perform queries in general purpose or specialized search engines. Users may browse to various sites with which they may be familiar.

Users often use the World Wide Web to find information relating to the user's field of expertise. For example, a physician may research a disease or condition for a patient that they may treat. Because of the physician's expertise, the physician may wish to see a different level of technical information than the patient or other layperson would want to see concerning the same disease. The patient may want to see a broad overview of the disease and some general explanation of different treatments for the disease, while the physician may wish to understand the details of the potential causes of the condition and tradeoffs between each course of treatment so that an appropriate treatment may be selected.

Commerce sites typically accommodate users with vastly different needs, expectations and experience levels. For example, when a user at a site attempts a natural language search in order to find information, results are typically returned in a "one size fits all manner". A novice user might formulate a search such as "how do I fix blurry photos", while a more sophisticated photographer might enter a search such as "fixing blurry photos via shutter speed settings". Typically, the same or similar set of results would be delivered to both the novice and the experienced photographer, potentially frustrating both sets of results.

SUMMARY

An apparatus, method and associated system is provided for the production of tailored search results that are determined to be of interest to the user based on the level of expertise of the user. Literature is analyzed from a plurality of different domains, and a corpus is built that is adapted to categorize the literature by different levels of expertise. Each item of literature is assigned a particular level of expertise in the corpus. At least one keyword in a user's search query is analyzed and compared with at least part of the corpus, and a user's level of expertise is determined based, at least in part, on the comparison. A set of search results is generated for the search query that is weighted, at least in part, based on a correlation between the user's level of expertise and the particular level of expertise assigned to each item of literature.

BRIEF DESCRIPTION OF THE DRAWINGS

While the specification concludes with claims particularly pointing out and distinctly claiming the present invention, it is believed the same will be better understood from the following description taken in conjunction with the accompanying drawings, wherein:

DETAILED DESCRIPTION OF THE EMBODIMENTS

Figure 1:
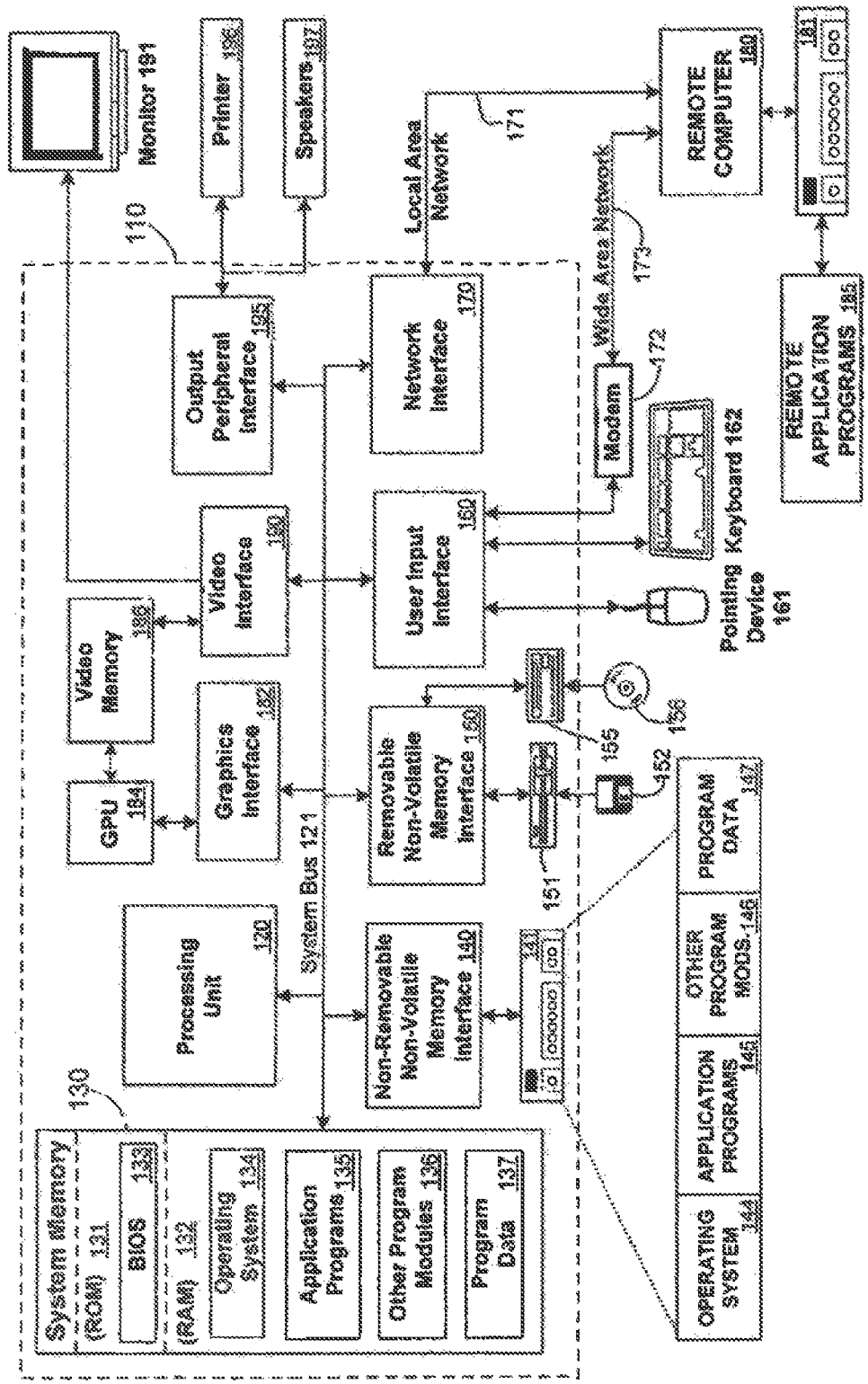
FIG. 1 is a block diagram showing an exemplary computing environment in which aspects of the present invention may be implemented.

There exists a need for a method and system that provide tailored search results including the potential to identify one or more products that are determined to be of interest to the user based on both the search phrase and the level of expertise of the user.

The present invention provides an apparatus, method, and associated system and computer program product, for generating tailored search results by determining a level of expertise of a user based, at least in part, on identification of one or more linguistics features in a search phrase, and comparing the linguistic features to a predetermined lexicon or vocabulary associated with literature for a particular domain. When a user's language choices match at least part of a generated lexicon, a set of search results for the search phrase is generated, where the search results are weighted, at least in part, based on a degree of correlation between a level of expertise of the user's vocabulary and the lexicon for literature created with the relevant domain.

A user's domain or technical expertise may be determined through a user's choice of words and language choice; i.e., the user's vocabulary and combinations thereof, within a web browser. The user's choice of language may be matched with a lexicon to provide a map or link to literature that matches the user's level of expertise. Once the level of domain expertise for a particular user is determined based on the user's language, search results may be tailored to that user.

Users with technical expertise in a particular field tend to use the World Wide Web in a different manner than novices who do not possess the same technical expertise. In many cases, the same person may use the World Wide Web differently when operating within the user's area of technical expertise than when the same person is searching for something with which they are not familiar. Often, the user's choice of words and language for a search may be indicative of the level of knowledge within a particular domain.

As a general rule, people with technical expertise in a specific field tend to perform search queries in different manners than novices and perform searches with a greater precision in the choice of words. An expert's queries tend to use more technical language and tend to be longer and more directed.

By monitoring a user's language usage within a web browser, an assessment of a user's technical domain expertise may be determined or at the least hypothesized. A measurement of the user's vocabulary and language elements may be linked to predefined categories of expertise in a domain. The user's expertise level may subsequently be used by a search engine to enhance the search results for the user. In cases where the user is an expert, the search results may increase the rank of results with technical details, and increase the rank of results that are visited by other experts. In cases where the user is not an expert, the search results may increase the rank of summary or overview results that have little technical jargon and detail. Notably, the present invention provides a universal methodology for tailoring search results that is suited to all users regardless of the user's expertise or history of web browsing. Regardless of the user's history, a user's search request will be matched to a domain repository database or corpus and the search results will be tailored to the vocabulary of the search request, which is typically an indication of the user's expertise level.

Throughout this specification, the term 'domain' and 'technical domain' is used to refer to a technical area of competence, as opposed to a 'web domain' which refers to a second or third level domain address for a website. A technical domain of expertise refers to a technical area or subject matter. A technical domain may be broad, such as the technical expertise associated with mathematical or computer science, or the technical domain may be narrow, such as the technical expertise associated with virtual server architecture within the broad technical domain of computer science. The term corpus is intended to refer to all writing and/or literature related to a particular domain or subject and the corpus compiled by this invention may be stored in a suitable database or other repository.

A technical domain can be any classification of human knowledge and are not limited to science or technology based fields. Examples of a technical domain may include hobbies such as photography, knitting, biking, or raising tropical fish. Other examples may include sports topics, such as professional football, athletic activities at a specific college, or coaching children's soccer. Still more examples may include a general topic of interest such as landscape photography, the writings of Plato, or any other classification of human knowledge.

Throughout this specification and claims, reference is made to a "web browser". The term "web browser" may include any device, application, or system that may gather and display information from disparate sources across a network, and where a user may search and browse such information. One example of such a system may be a browsing application that may display information from servers using Hyper Text Transport Protocol (HTTP). Some servers may contain databases of links to other servers, and may respond to search queries by presenting a list of such links that are related to a search query.

In accordance with this invention, a lexicon, curriculum and/or map is generated by the system whereby literature is categorized into different levels of expertise for a given topic or domain. The lexicon is stored as a classification model accessible by the system. The term "literature" as used herein is intended to encompass all types of information associated with a given topic and the entire body of writings on a particular subject or domain; for example, product as described on the Internet, services, advertisements for products and/or services, sales promotions, technical specifications, leaflets, novels, product catalogues, user manuals, academic documents, historical references, sales documents/data, scientific journals, desk references, etc. The foregoing list is not intended to be exhaustive of the types of literature or works on any particular subject, whether stored as a hyperlink or otherwise.

In accordance with this invention, a system is provided for generating a lexicon, curriculum and/or map of literature for all domains, whereby the lexicon is not personal to a particular user; instead, the lexicon is generated over a wide range of domains to categorized information for the masses. The user's search vocabulary may be linked to the lexicon to generate search results that match the user's chosen vocabulary, thereby providing tailored search results for a given search request. The lexicon is generated based on known techniques. For example, the literature may be scanned or reviewed to identify one or more keyword and the keywords may be analyzed using the lexicon to determine the expert level for a particular item of literature. Once assigned a level of expertise, the item of literature is stored in a domain repository database for access during lexicon model training.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
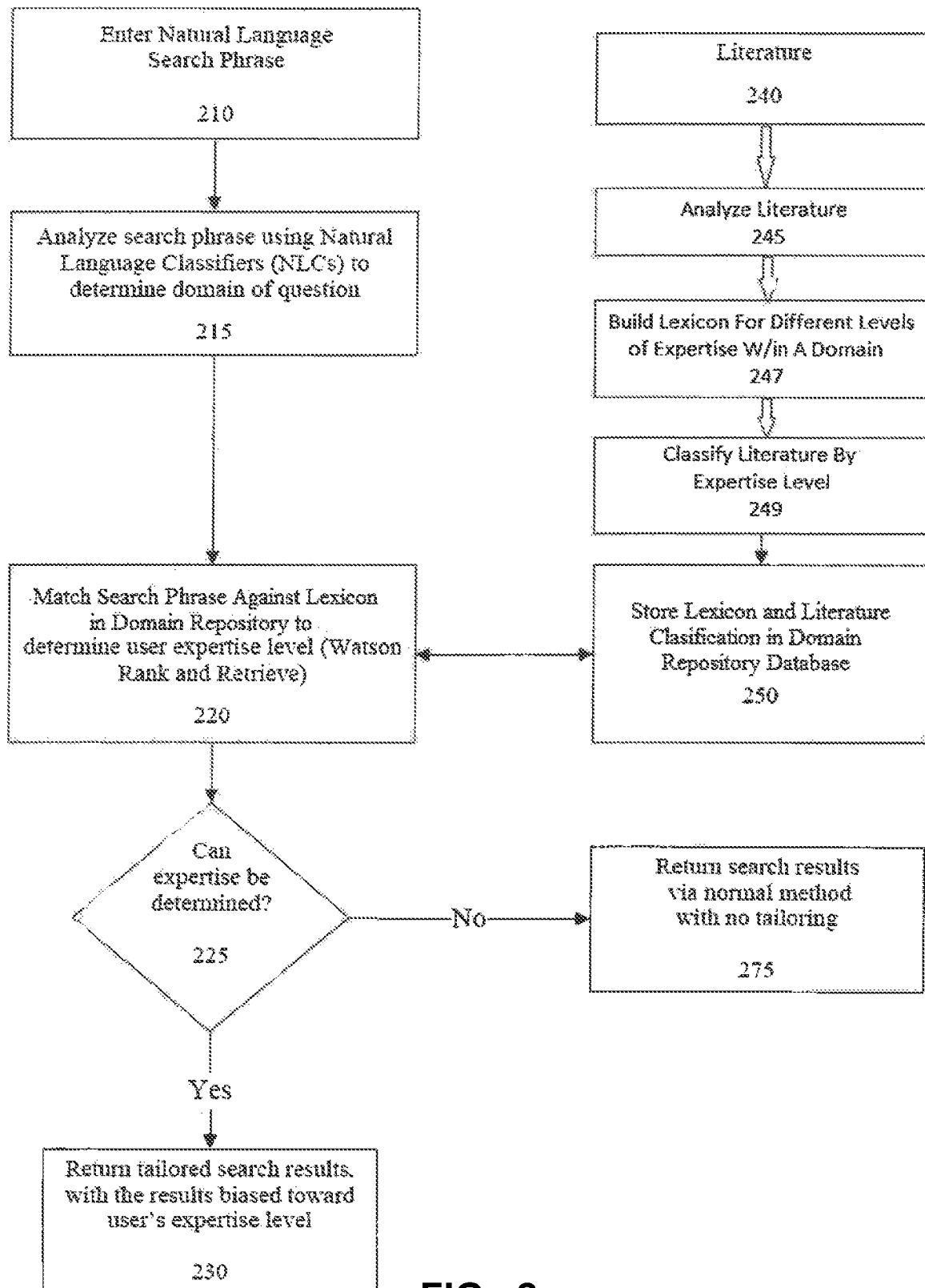
FIG. 2 is a flow chart of a method for generating a lexicon that is associated with a given level of expertise associated with a topic and determining a level of expertise of a user based thereon according to one embodiment of the present invention.

FIG. 2 is a flow chart of a method for generating a lexicon that is associated with a given level of expertise associated with a topic, and determining a level of expertise of a user based thereon according to one embodiment of the present invention. Referring now to FIG. 2, a user may enter a natural language search phrase (step 210) so that the system will analyze the search phrase using natural language classifiers to determine the domain of the search questions (step 215). The system then matches the search phrase against expertise classifications in domain repository (box 250) to determine the user's expertise level (step 220).

If the system can determine the user's expertise (step 225) to the domain repository database 250, search results are returned with a bias towards the user's expertise level (step 230). If the user's expertise cannot be determined based on the vocabulary of the keyword search request, the search results are returned via normal and standard method without tailoring the search results (step 275).

Figure 3:
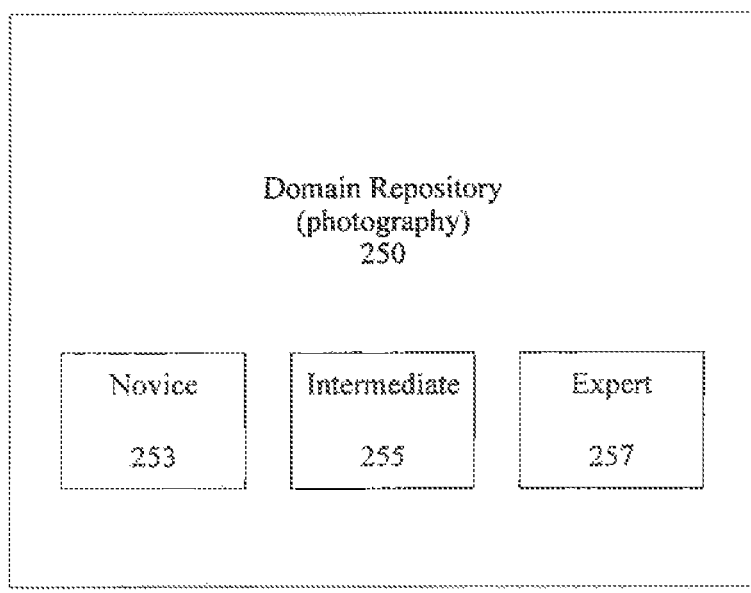
FIG. 3 is an expanded diagram for one of the elements in FIG. 2 according to one embodiment of the present invention.

FIG. 3 is an expanded diagram for one of the elements in FIG. 2 according to one embodiment of the present invention. Notably, the system creates a domain repository 250 for a given domain (e.g., photography). As shown in FIG. 3 the domain repository 250 may be created by collecting literature at step 240 and analyzing different expertise levels of the domain literature at step 245 (e.g., "Photography for Dummies"—novice user, "Photo Techniques for the Serious Hobby Photographer"—intermediate level user, and "Digital Photography for Professionals—expert level). A lexicon is built up for each level of expertise within the domain (step 247) and the literature is classified into a database according to expertise level at step 249. The steps of building the domain repository (steps 240-250) are typically completed in advance of the user's query.

As previously stated, at step 215, an analysis is performed on a user's search phrase in order to determine the appropriate domain for the user's query. This can be accomplished, for example, by Watson Natural Language Classifiers or other suitable domain classification methodology. In the example presented above, the search phrases "fixing blurry photos" and "fixing blurry photos via shutter speed settings" would both be determined to be relevant to the domain of "photography". The user's search phrase is then analyzed against the relevant domain repository order to determine a level of expertise for the user.

By way of example, the IBM Watson™ Natural Language Classifier enables developers without a background in machine learning or statistical algorithms to create natural language interfaces for the applications. The service interprets the intent behind text, for example, within a search query, and returns a corresponding classification with associated confidence levels. The return value can then be used to trigger a corresponding action, such as redirecting the request or answering a question or providing a search engine with an expertise level of a user making a query. The IBM Watson™ Natural Language Classifier service applies deep learning techniques to make predictions about the best predefined classes for short sentences or phrases. The classes can trigger a corresponding action in an application, such as directing a request to a location or person, or answering a question. The service supports various languages including English, Arabic, French, German, Italian, Japanese, Portuguese, and Spanish.

Using such a system, the user's query may analyzed to determine the domain of a particular question (step 215), and at step 220 it may classify the question into a user expertise level by comparing the query with the established lexicon in the domain repository database 250.

If the user's expertise cannot be determined by the analysis at step 225, the search results are returned normally at step 275. If the user's expertise level can be determined, a set of search results specifically tailored to the specific expertise level of the user is returned a step 230.

As an example and referring to FIG. 3 showing a detailed view of domain repository 250, if the user is a novice 253, the results may be ordered in such a way that "how to guides" would be featured more prominently. If the user is an intermediate 255 or advanced user 257, the search results may be ordered such that "user manuals" and "white papers" are featured more prominently. Watson Rank and Retrieve is one example of one way in which user expertise may be used to match to results in the domain repository in order to tailor search results matched to the expertise of the user. The IBM Watson Retrieve and Rank service helps users find the most relevant information for the query by using a combination of search and machine learning to find signals in the data, and enables enhancement of standard search implementations with natural language and machine learning capabilities.

The IBM Watson™ Retrieve and Rank service combines two information retrieval components in a single service: the power of an open source enterprise search platform and a sophisticated machine learning capability. This combination provides users with more relevant results by automatically re-ranking them by using these machine learning algorithms. The purpose of the Retrieve and Rank service is to help you find documents that are more relevant than those that you might get with standard information retrieval techniques. The ranker mode takes advantage of rich data in your documents to provide more relevant answers to queries. The Retrieve & Rank service is used to find potential answers, generate numerical features to score those answers, and rank order those answers using a machine learning model to turn the numerical features associated with each feature into a confidence score.

In a manner exemplified by the foregoing description, once an expertise level is determined for a user based on the user's vocabulary in a search query when compared to the domain repository database 250, search results may be returned to the user. For example, if the search is related to photography, and if the expertise level of the user is "high", the search results are tailored such that higher-end products (ones that are most expensive) are featured most prominently in the search results and/or more technical articles, white papers or relevant expert documents are featured more prominently in the search results.

In another embodiment, once an expertise level is determined for a user, in-site product advertising and/or promotional material may be driven by the expertise level determined at step 220. For example, if the search is related to photography, and if the expertise level of the user is "high", advertisements will be tailored to feature high end products such as cameras having full frame sensors, whereas if the user's expertise level is "low" the site advertisements will be driven toward more mainstream products such as "point-and-shoot" cameras. Thus, sales promotions may be focused toward a user's skill set or expertise level. Of course, variations on the types of results will be apparent to those of skill in the art given the expertise-level matching accomplished at step 200.

Figure 4:
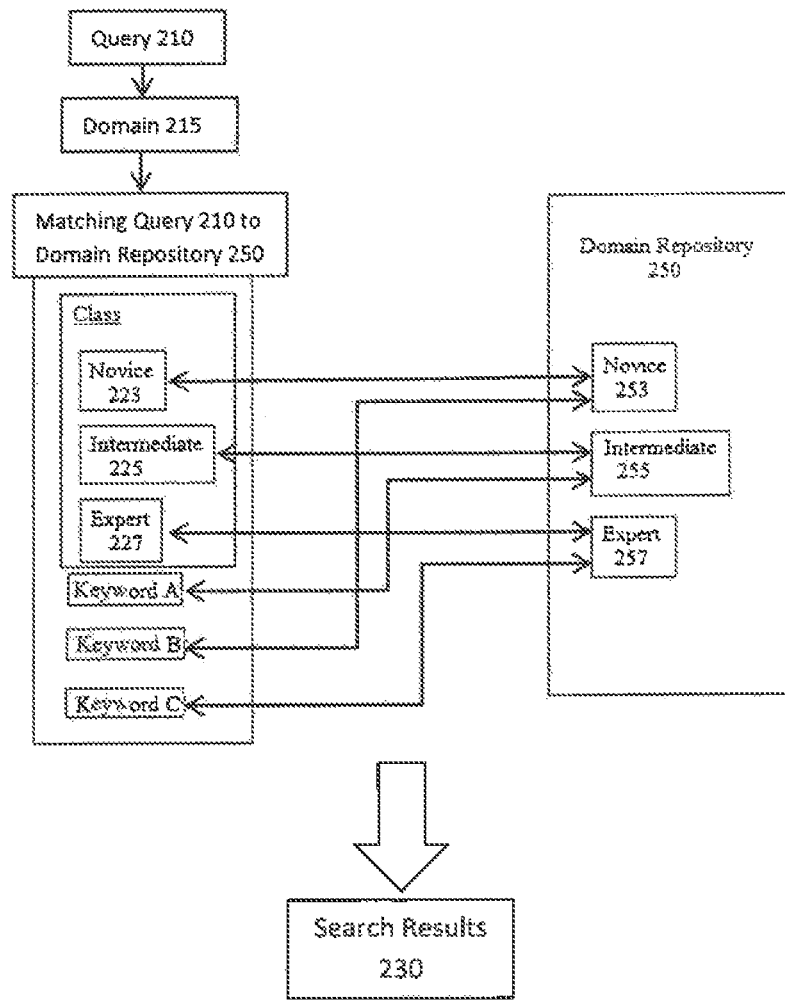
FIG. 4 is a flow chart illustrating the methodology to match search query words and phrases to a particular domain and then against the established lexicon.

FIG. 4 is a flow chart illustrating the methodology to match search query words and phrases to a particular domain and then against the established lexicon. As shown in FIG. 4, the query 210 is entered into the system at step 210, and the query is analyzed at step 215 to determine the domain. In one embodiment of the invention, the query is further analyzed to determine and classify the expertise level of the user; e.g., novice 223, intermediate 225, or expert 227 for example by a natural language classifier. In an alternate embodiment, the expertise level of the user is determined by a comparison of the keyword(s) (e.g., Keyword A, Keyword B, Keyword C) to the domain repository 250 which includes a predetermined lexicon of keywords and related levels of expertise for a given domain.

In accordance with the invention, at step 220 the keywords are compared to and matched with the lexicon in the domain repository 250 which has been previously established using the techniques discussed above. In this manner, the search query phrases are matched against the lexicon in the domain repository to match a user's expertise level to the appropriate literature and associated products. This process may take various forms according to the invention: first, the search query may be analyzed and classified according to different levels of expertise; e.g., novice 223, intermediate 225, and expert 227; then, the classified search query may be compared to corresponding levels of classification in the domain repository 250. Alternatively, the domain repository 250 may include a lexicon or vocabulary of terms that have been themselves classified according to a predetermined hierarchy; e.g., novice 253, intermediate 255, and expert 257. Here, the terms or keywords (e.g. Keyword A, Keyword B, Keyword C) of the search query 210 may be compared to the lexicon of the domain repository and matched to the appropriate expertise level.

In either instance, the search results 230 are promulgated based on the matching of the expertise level of the search query 210 and the lexicon of the domain repository 250 and the search results 230 are weighted according to this expertise matching.

The invention set forth herein may take many forms, but it is envisioned that one method for accomplishing the objectives and methods of the invention takes the form of an algorithm or set of algorithms to detect expertise level based on language used in a search query. According to one aspect of the invention, the lexicon and literature classification is stored in a domain repository corpus which is created using an algorithm that reads or analyzes each article or item of literature for a particular domain. In one embodiment, the domain literature is divided into expertise collections; for example, through a manual or automated creation process. By way of example, domain literature related to photography may be divided into three (3) expertise collections; e.g., novice, intermediate, and expert. Each collection contains at least one item, but possibly hundreds or even thousands of articles, books, publications, web pages, etc.

For example, a model may be built for each collection i.e. a model_novice, model_intermediate, and model_expert. Model building pseudo code logic (see step 245 and 247 in FIG. 2) may be represented as follows:

```
Begin
  C_p = Collection feature pool (empty)
  For each document d in collection C:
    P_d = Preprocess document (see note1)
    F_d = Extract linguistic features from P_d
    Add F_d to C_p
  Post-process C_p (see note 3)
  Save C_P as model for Collection.
End
```

The system 100 (see FIG. 1) may use existing methods such as removing stopwords using known NLP techniques (i.e. 'The', 'a', 'an', etc.), stemming words like 'walking'→'walk', lowercasing all text, and replacing numbers with NUM tokens, etc. The result is a token stream of individual tokens; i.e., a sentence 'the cat on sat on the white mat' might become ['cat', 'sat', 'on', 'white', 'mat']

For the algorithm phrase "F_d=Extract linguistic features from P_d," the token stream may be interpreted as a series of trigrams (n-grams of 3, which is a subset of 3 consecutive words from the stream). I.e. ['cat', 'sat', 'on', 'white', 'mat'] contains the trigrams ['cat', 'sat', 'on'], ['sat', 'on', 'white'], ['on', 'white', 'mat']. The system 100 may convert the whole stream into a collection of trigram token (keep duplicates). Also, the system 100 may perform bigrams (length 2) and unigrams (length 1; i.e., just the vocabulary).

For the foregoing algorithm, C_p contains the raw n-grams output from the for loop. There may be many duplicates. The system 100 may keep the duplicates, but (optionally) filter out n-grams that appear too infrequently (problem dependent parameter). The result is a table of trigrams and associated counts as follows:

| Trigram | Count (1 in our example) |
| --- | --- |
| ['cat', 'sat', 'on'] | 15 |
| ['sat', 'on', 'white'] | 13 |
| ['on', 'white', 'mat'] | 11 |
| . . . Other bigrams and unigrams | . . . |

Those of skill in the art will understand that the foregoing example provides one embodiment for training a domain expertise model for one domain collection of literature.

In order to score the domain collection for one domain model following from the steps provided above, an incoming sentence may be broken down into a series of trigram, bigrams and unigrams exactly the same way as discussed above. One difference may be that instead of adding the series of trigram, bigrams and unigrams to any collection at runtime, the system 100 may compute the "distance" to the "closest language" using the series of trigram, bigrams and unigrams. The collection that is "closest" is associated with a particular domain's three (3) expertise levels; i.e., there are three (3) expertise collections for "Novice", "Intermediate" and "Expert," respectively.

The system 100 may run the following model for building the pseudo code logic as described in step 225 of FIG. 2.

```
Begin
  Dom = domain detected in step 215 in FIG. 2 (received as parameter)
  Models_domain = retrieve three models model_novice,
  model_intermediate
    and model_expert for detected domain dom.
  F_q = Extract linguistic features from query q (see note 1 below)
  Deg_n = distance to model model_novice
  Deg_i = distance to model model_intermediate
  Deg_e = distance to model model_expert
  Winner = model proportionally to language used.
  Return expertise level associated with winning model
End
```

For the expression "F_q=Extract linguistic features from query q," the system 100 perform the same or substantially the same logic as in the expertise model training, but the logic is applied only to the query; i.e., the same data transforms to clean the text and extract the trigrams, bigrams and unigrams is applied to the query as described above. The result is a list of trigrams, bigrams and unigrams for the query.

For the expressions, Deg_n, Deg_i, and Deg_e, the objective is to find the collection that has the "closest matching language" to the language set used in the query. To accomplish this objective, the system 100 uses set-wise matching operations between: (a) the set of trigrams, bigrams and unigrams for the query (S_q), and (b) the set of trigrams, bigrams and unigrams for the collection compared against (S_C). The degree of overlap (Deg_C) between the query's language, S_q, and the compared target collection, S_C, is defined as:

$$Deg\_C = \frac{|S_q \cap S_C|}{|S_q \cup S_C|}$$

Each model C may yield a Deg_C number in the range [0,1]. The system 100 now converts those three (3) numbers to a single probability. The resulting list [Deg_n-scaled, Deg_i-scaled, Deg_i-scaled] will always sum to 1, and represents the odds that the query represents a specific collection via is "language usage."

where $$Deg\_n\text{-scaled} = \frac{e^{Deg_n}}{e^{Deg_n} + e^{Deg_i} + e^{Deg_e}}$$

$$Deg\_i\text{-scaled} = \frac{e^{Deg_i}}{e^{Deg_n} + e^{Deg_i} + e^{Deg_e}}$$

$$Deg\_e\text{-scaled} = \frac{e^{Deg\_e}}{e^{Deg\_n} + e^{Deg\_i} + e^{Deg\_e}}$$

The invention set forth above may be accomplished using a computer program product as will be understood by those of skill in the art. A computer program product of the present invention comprises a computer readable hardware storage device having computer readable program code stored therein, the program code containing instructions executable by a processor of a computer system to implement the methods of the present invention.

Figure 5:
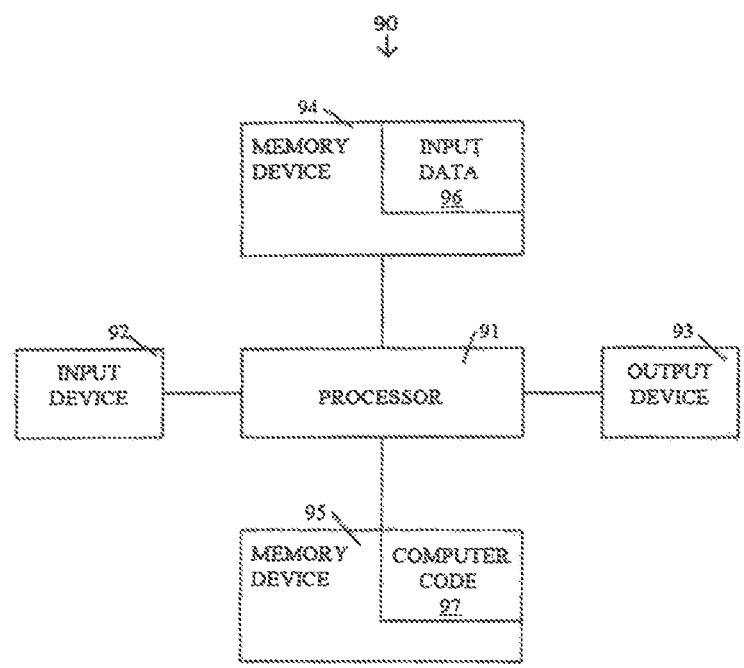
FIG. 5 illustrates a computer system used for implementing the methods of the present invention.

FIG. 5 illustrates a computer system 90 used for implementing the methods of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that includes computer-executable instructions. The computer code 97 includes software or program instructions that may implement an algorithm for implementing methods of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may be used as a computer usable storage medium (or program storage device) having a computer readable program embodied therein and/or having other data stored therein, wherein the computer readable program includes the computer code 97. Generally, a computer program product (or, alternatively, an article of manufacture) of the computer system 90 may include the computer usable storage medium (or said program storage device).

The processor 91 may represent one or more processors. The memory device 94 and/or the memory device 95 may represent one or more computer readable hardware storage devices and/or one or more memories.

Thus the present invention discloses a process for supporting, deploying and/or integrating computer infrastructure, integrating, hosting, maintaining, and deploying computer-readable code into the computer system 90, wherein the code in combination with the computer system 90 is capable of implementing the methods of the present invention.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

A computer system of the present invention comprises a processor, a memory, and a computer readable hardware storage device, said storage device containing program code executable by the processor via the memory to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing description, it will be apparent to those of skill in the art that an apparatus, method and associated system is provided for the production of tailored search results that are determined to be of interest to the user based on the level of expertise of the user. Literature is analyzed from a plurality of different domains, a database of literature categorized by different levels of expertise is built, and a model of linguistic features is trained using the database. Each item of literature is assigned a particular level of expertise in the database. A plurality of linguistic features present in a user's search query is analyzed using the trained model to determine a user's level of expertise. A set of search results is generated for the search query that is weighted, at least in part, based on a correlation between the user's level of expertise and the particular level of expertise assigned to each item of literature. The model is notable because the model is used to determine expertise, i.e. the model is the mechanism the query is related to content in the database.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method implemented by a computer for generating search results categorized by expertise level of a user, said method comprising:

analyzing, by the computer, literature from a plurality of different domains, building, by the computer, a corpus for literature of a domain of the plurality of domains, the corpus categorized by different levels of expertise, wherein building the corpus includes dividing a plurality of items of said literature of the domain into a first series of trigrams, bigrams, and unigrams and assigning each item of the plurality of items of said literature of the domain to a particular level of expertise from said different levels of expertise;

analyzing, by the computer, at least one keyword in a user's search query submitted to a search engine, wherein analyzing the at least one keyword includes dividing the at least one keyword into a second series of trigrams, bigrams, and unigrams;

comparing said at least one keyword with at least part of said corpus by comparing the second series of trigrams, bigrams, and unigrams with the first series of trigrams, bigrams, and unigrams and computing a closest item of said literature of the domain;

determining a user's level of expertise based on said step of comparing said at least one keyword with said at least part of said corpus and without considering a history of the user;

generating a set of search results for the search query that are weighted, at least in part, based on a correlation between said user's determined level of expertise and a respective level of expertise assigned to the closest item of said literature of the domain; and including, in said search results, at least one product that is determined to be of interest to the user based on both the search query and the determined level of expertise of the user and without considering the history of the user.

2. The method of claim 1, further comprising:
building, by the computer, a lexicon that is associated with said different levels of expertise;
comparing said at least one keyword with at least part of said lexicon; and
determining a user's level of expertise based, at least in part, on comparing said at least one keyword with said at least part of said lexicon.

3. The method of claim 1, further comprising:
generating a sales promotion based on the determination of the user's level of expertise based on said step of comparing said at least one keyword with said at least part of said corpus and without considering a history of the user.

4. The method of claim 1, further comprising:
assigning said at least one keyword in said user's search query submitted to said search engine a level of expertise prior to said step of comparing.

5. The method of claim 1, further comprising:
comparing at least one term contained within said at least one item of said literature with said corpus, said particular level of expertise for each item defined by a complexity of prose contained in said at least one item of said literature.

6. The method of claim 2, further comprising:
defining said lexicon based on said plurality of terms associated with said particular domain.

7. The method of claim 1, further comprising:
presenting, to the user, an advertisement for at least one product that is determined to be of interest to the user based on both the search query and the determined level of expertise of the user without considering the history of the user.

8. A computer program product, comprising a computer readable storage device having computer readable program code stored therein, said program code containing instructions executable by a processor of a computer system to implement a method to generate expertise tailored search results, said method comprising:

analyzing, by the computer, literature from a plurality of different domains;

building, by the computer, a corpus for literature of a domain of the plurality of domains, the corpus categorized by different levels of expertise, wherein building the corpus includes dividing a plurality of items of said literature of the domain into a first series of trigrams, bigrams, and unigrams and assigning each item of the plurality of items of said literature of the domain to a particular level of expertise from said different levels of expertise;

analyzing, by the computer, at least one keyword in a user's search query submitted to a search engine, wherein analyzing the at least one keyword includes dividing the at least one keyword into a second series of trigrams, bigrams, and unigrams;

comparing said at least one keyword with at least part of said corpus by comparing the second series of trigrams, bigrams, and unigrams with the first series of trigrams, bigrams, and unigrams and computing a closest item of said literature of the domain;

determining a user's level of expertise based on said step of comparing said at least one keyword with said at least part of said corpus and without considering a history of the user;

generating a set of search results for the search query that are weighted, at least in part, based on a correlation between said user's determined level of expertise and a respective level of expertise assigned to the closest item of said literature of the domain; and including, in said search results, at least one product that is determined to be of interest to the user based on both the search query and the determined level of expertise of the user and without considering the history of the user.

9. The computer program product of claim 8, further comprising:
building, by the computer, a lexicon that is associated with said different levels of expertise;
comparing said at least one keyword with at least part of said lexicon; and
determining a user's level of expertise based, at least in part, on comparing said at least one keyword with said at least part of said lexicon.

10. The computer program product of claim 8, further comprising:
generating a sales promotion based on the determination of the user's level of expertise based on said step of comparing said at least one keyword with said at least part of said corpus and without considering a history of the user.

11. The computer program product of claim 8, further comprising:
assigning said at least one keyword in said user's search query submitted to said search engine a level of expertise prior to said step of comparing.

12. The computer program product of claim 8, further comprising:
comparing at least one term contained within said at least one item of said literature with said corpus, said particular level of expertise for each item defined by a complexity of prose contained in said at least one item of said literature.

13. The computer program product of claim 9, further comprising:
defining said lexicon based on said plurality of terms associated with said particular domain.

14. The computer program product of claim 8, further comprising:
determining a domain category for said at least one keyword.

15. The computer program product of claim 8, further comprising:
assigning a particular domain to each item of said literature from said plurality of domains.

16. The computer program product of claim 8, further comprising:

presenting, to the user, an advertisement for at least one product that is determined to be of interest to the user based on both the search query and the determined level of expertise of the user without considering the history of the user.

17. A computer system, comprising a processor, a memory coupled to the processor, and a computer readable storage device coupled to the processor, said storage device containing program code executable by the processor via the memory to implement a method for generating search results based upon an expertise level of a user, said method comprising:

analyzing, by the computer, literature from a plurality of different domains;

building, by the computer, a database for literature of a domain of the plurality of domains, the database categorized by different levels of expertise, wherein building the database includes dividing a plurality of items of said literature of the domain into a first series of trigrams, bigrams, and unigrams and assigning each item of the plurality of items of said literature of the domain a particular level of expertise from said different levels of expertise;

analyzing, by the computer, at least one keyword in a user's search query submitted to a search engine, wherein analyzing the at least one keyword includes dividing the at least one keyword into a second series of trigrams, bigrams, and unigrams;

comparing said at least one keyword with at least part of said database by comparing the second series of trigrams, bigrams, and unigrams with the first series of trigrams, bigrams, and unigrams and computing a closest item of said literature of the domain;

determining a user's level of expertise based on said step of comparing said at least one keyword with said at least part of said database and without considering a history of the user;

generating a set of search results for the search query that are weighted, at least in part, based on a correlation between said user's determined level of expertise and a respective level of expertise assigned to the closest item of said literature of the domain;

identifying a product, the product determined to be of interest to the user based on both the search query and the determined level of expertise of the user and without considering a history of the user; and presenting, along with the search results, at least one of the product and an advertisement for the product to the user.

18. The computer system of claim 17, further comprising:

building, by the computer, a lexicon that is associated with said different levels of expertise;

comparing said at least one keyword with at least part of said lexicon; and determining a user's level of expertise based, at least in part, on comparing said at least one keyword with said at least part of said lexicon.

\* \* \* \* \*